United States Patent
Alkhazraji

(10) Patent No.: US 10,814,245 B2
(45) Date of Patent: *Oct. 27, 2020

(54) SOLAR STILL APPARATUS

(71) Applicant: Saeed Alhassan Alkhazraji, Abu Dhabi (AE)

(72) Inventor: Saeed Alhassan Alkhazraji, Abu Dhabi (AE)

( * ) Notice: Subject to any disclaimer, the term of this patent is extended or adjusted under 35 U.S.C. 154(b) by 500 days.

This patent is subject to a terminal disclaimer.

(21) Appl. No.: 14/469,255

(22) Filed: Aug. 26, 2014

(65) Prior Publication Data

US 2016/0059148 A1  Mar. 3, 2016

(51) Int. Cl.
| | | |
|---|---|---|
| *B01D 1/00* | (2006.01) | |
| *B01D 5/00* | (2006.01) | |
| *C02F 1/14* | (2006.01) | |
| *C02F 103/08* | (2006.01) | |

(52) U.S. Cl.
CPC .......... *B01D 1/0005* (2013.01); *B01D 1/0035* (2013.01); *B01D 5/0066* (2013.01); *C02F 1/14* (2013.01); *C02F 2103/08* (2013.01); *Y02A 20/128* (2018.01); *Y02A 20/212* (2018.01)

(58) Field of Classification Search
CPC ...... C02F 1/04; C02F 1/14; C02F 1/18; C02F 2103/08; B01D 5/0018; B01D 1/0035; B01D 5/0066; B01D 1/0005
USPC ............................................... 159/904, 903
See application file for complete search history.

(56) References Cited

U.S. PATENT DOCUMENTS

| | | | |
|---|---|---|---|
| 2,636,129 A | | 4/1953 | Agnew |
| 2,807,912 A | | 10/1957 | Bjorksten |
| 2,813,063 A | | 11/1957 | Bjorksten |
| 2,820,744 A | * | 1/1958 | Lighter ................ B01D 5/0066 202/190 |
| 3,338,797 A | | 8/1967 | Hermansen et al. |
| 3,351,536 A | * | 11/1967 | Fox ....................... B01D 5/0066 202/188 |
| 3,357,898 A | * | 12/1967 | Novakovich ............. C02F 1/14 159/904 |

(Continued)

*Primary Examiner* — Jonathan Luke Pilcher
(74) *Attorney, Agent, or Firm* — Hayes Soloway PC

(57) ABSTRACT

There is provided a solar still apparatus for converting contaminated water contained in a contaminated water body into distillate water, the contaminated water body having a water surface, the solar still apparatus comprising a cover in the form of a geometrical projection comprising a wall, an opening and a chamber, wherein the wall is adapted to be in thermal communication with the external environment for capturing solar heat and in optical communication with the opening for allowing passage of solar rays from the external environment to the opening; the opening is adapted to be in optical communication with the wall and the surface of the contaminated water body for allowing passage of the solar rays from the wall to the surface of the contaminated water body for heating the contaminated water to form a vapor, and adapted to be in fluid communication with the surface of the contaminated water body and the chamber for allowing passage of the vapor from the surface of the contaminated water body inside the chamber; and the chamber is defined by the wall, the chamber being adapted to be in fluid communication with the opening for receiving the vapor formed and condensing the vapor for forming condensed distillate water therefrom.

16 Claims, 2 Drawing Sheets

(56) References Cited

U.S. PATENT DOCUMENTS

| | | | |
|---|---|---|---|
| 3,408,260 A * | 10/1968 | Feldman | B01D 5/0066 202/83 |
| 3,414,481 A | 12/1968 | Kelly, Jr. | |
| 3,490,996 A | 1/1970 | Kelly, Jr. | |
| 3,501,381 A | 3/1970 | Delano | |
| 4,172,767 A | 10/1979 | Sear | |
| 4,197,162 A * | 4/1980 | Cardinal, Jr. | C02F 1/18 159/904 |
| 4,244,189 A | 1/1981 | Bliamptis | |
| 4,253,307 A | 3/1981 | Smith | |
| 4,302,297 A | 11/1981 | Humiston | |
| 4,326,923 A | 4/1982 | Mortenson | |
| 5,064,505 A | 11/1991 | Borgren | |
| 5,198,076 A | 3/1993 | Borgren | |
| 5,409,578 A | 4/1995 | Kaneko | |
| 5,522,970 A | 6/1996 | Shimizu et al. | |
| 5,598,661 A | 2/1997 | Eiderman et al. | |
| 6,001,222 A | 12/1999 | Klein | |
| 6,656,326 B2 * | 12/2003 | Nagler | B01D 1/0005 202/234 |
| 7,494,572 B2 | 2/2009 | Tonkin et al. | |
| 2002/0092761 A1 * | 7/2002 | Nagler | B01D 1/0005 202/234 |
| 2003/0038022 A1 * | 2/2003 | Rogde | B01D 5/009 202/234 |
| 2003/0209419 A1 * | 11/2003 | Tonkin | B01D 61/362 203/10 |
| 2004/0084357 A1 * | 5/2004 | Nagler | B01D 1/28 210/85 |
| 2010/0275599 A1 | 11/2010 | Glynn | |
| 2012/0112473 A1 | 5/2012 | Glynn | |
| 2012/0138447 A1 | 6/2012 | Glynn | |
| 2014/0034476 A1 | 2/2014 | Ljunggren | |
| 2014/0034477 A1 | 2/2014 | Landrok | |
| 2014/0158516 A1 | 6/2014 | Landrok | |
| 2015/0138324 A1 | 5/2015 | Shirai | |
| 2016/0057948 A1 * | 3/2016 | Alkhazraji | A01G 25/16 202/189 |
| 2016/0059148 A1 | 3/2016 | Alkhazraji | |
| 2016/0060136 A1 * | 3/2016 | Alkhazraji | C02F 1/14 202/186 |

\* cited by examiner

SOLAR STILL APPARATUS

FIELD OF THE INVENTION

The present invention generally relates to the field of water distillation, and more particularly to an apparatus for production of distilled water from contaminated water bodies, knowingly natural contaminated water bodies such as seas and oceans.

BACKGROUND OF THE INVENTION

There are various types of distillation techniques known in the art including solar distillation. The solar distillation technique uses solar energy for creating an evaporation-condensation cycle where contaminated water is converted into distillate water through the evaporation-condensation process using solar energy. This cycle is well known in nature, as rain (which is a form of distilled water) occurs through a natural phenomenon of hydrologic cycle when water in natural water bodies like oceans, seas, rivers and ponds evaporates by the effect of solar energy and gets accumulated in the atmosphere as clouds and fogs to be condensed and fall again on the earth surface in a form of rain and snow.

There are two traditional forms of solar distillation, active distillation and passive distillation. In passive solar distillation, the apparatus relies on the natural temperature difference between the basin and the top of the apparatus as a means to condense water. In active solar distillation, external energy is supplied to the basin to increase the temperature difference between the basin and the top to further improve productivity.

Traditional solar distillation systems have many drawbacks. For example, traditional solar distillation systems are installed on land and water must be fed to it from a nearby water source which results in complexities and limitations in transferring the non-potable water (brackish water or seawater) into the systems. Also, the water left out after purification is highly concentrated with salts, bacteria and other impurities such as ion which must be removed from the systems after each purification cycle according to certain standards. This adds to the complexities and limitations of traditional systems. In addition, the production of potable water using these traditional systems is limited to the size of the reservoirs which also result in complexities and limitations to produce and maintain.

Natural water bodies on earth contain huge amount of water, however most of the total available water on earth is practically not potable and therefore not consumable or usable by humans because it is either saline water or brackish water. Such natural water bodies comprise oceans, seas, rivers, ponds and the like. Traditional distillation systems have failed to efficiently use the natural water bodies for the production of distilled water.

SUMMARY OF THE INVENTION

Therefore, it is an object of the present invention to provide an apparatus and method for production of distilled water directly from the natural water bodies which would overcome at least a part of the above mentioned drawbacks.

As a first aspect of the present invention, there is provided a solar still apparatus for converting contaminated water contained in a contaminated water body into distillate water, the contaminated water body having a water surface, the solar still apparatus comprising a cover in the form of a geometrical projection comprising a wall, an opening and a chamber, wherein:

the wall is adapted to be in thermal communication with the external environment for capturing solar heat and in optical communication with the opening for allowing passage of solar rays from the external environment to the opening;

the opening is adapted to be in optical communication with the wall and the surface of the contaminated water body for allowing passage of the solar rays from the wall to the surface of the contaminated water body for heating the contaminated water to form a vapor, and adapted to be in fluid communication with the surface of the contaminated water body and the chamber for allowing passage of the vapor from the surface of the contaminated water body inside the chamber; and the chamber is defined by the wall, the chamber being adapted to be in fluid communication with the opening for receiving the vapor formed and condensing said vapor for forming condensed distillate water therefrom.

Preferably, the opening is adapted to form a seal with the surface of the contaminated water body for sealing the chamber and restricting the formed vapor from exiting the chamber to the external environment.

Preferably, the wall is made of a transparent material for enabling the passage of the solar rays. Preferably, the wall is made of a rigid material such as plastic, or metallic or ceramic.

The solar still apparatus as claimed in claim 1 further comprising an optical lens adapted to concentrate and direct the sun rays toward the opening.

In an embodiment of the invention, the optical lens forms an integral part of the wall. The lens can also be an independent component secured to the wall.

In an embodiment of the invention, the apparatus further comprises a floatable base for supporting and enabling the cover to float over the surface of the contaminated water body.

Preferably, the floatable base comprises floatable material such as foam. The floatable base can also comprise any other floatable material capable of enabling the cover to float. The base can also comprise inflatable parts such as floaters.

In an embodiment of the invention, the apparatus further comprises an anchorage device. Preferably, the anchorage device is adapted to be anchored to the ground of the contaminated water body for restricting the base (and the cover) from moving over the water.

In an embodiment of the invention, the apparatus further comprises a condensed water collector adapted to be secured to the wall inside the chamber for collecting the condensed distillate water forming on the surface of the wall inside the chamber.

Preferably, the condensed water collector is in the form of a gutter, however it can take any other shape depending on the nature/shape/configuration of the wall/cover.

In an embodiment of the invention, the apparatus further comprises a conduit in fluid communication with the condensed water collector for directing the condensed distillate water outside the chamber.

In an embodiment of the invention, the apparatus further comprises an off-shore reservoir in fluid communication with the conduit for storing the condensed distillate water. Preferably, the off-shore is located in proximity of the cover.

In an embodiment of the invention, the apparatus further comprises a pump in fluid communication with the off-shore reservoir for pumping the distillate water stored inside the off-shore reservoir to a land reservoir through long range conduits.

Preferably, the off-shore reservoir is a floatable reservoir adapted to float over the surface of the contaminated water body.

Preferably, the conduit is a floatable conduit adapted to float over the surface of the contaminated water body.

In an embodiment of the invention, the geometrical projection form of the cover is a dome extending along a vertical axis from a bottom end to a top end, the bottom end being in contact with contaminated water body when the apparatus is in operation.

Preferably, the cover opening is defined by a circular cross-section of the dome orthogonal to the vertical axis between the bottom end and the top end. The cross-section can for example be at the bottom end of the dome.

Preferably, the opening defined by the cross-section has a circumference forming a cover base, the solar still apparatus further comprising a floatable material jacketing the base for enabling the base to float over the surface of the contaminated water body.

The geometrical projection form can however be any other geometrical form suitable to capture the sun rays and direct them to an opening with a direct access to the contaminated water and in fluid communication with a closed chamber, such as a cone.

Preferably, the opening defined by the cross-section has a circumference forming a cover base, the solar still apparatus further comprising a floatable material jacketing the base for enabling the base to float over the surface of the contaminated water body.

BRIEF DESCRIPTION OF THE DRAWINGS

The invention will now be described with reference to the accompanying drawings, which illustrate a preferred embodiment of the present invention without restricting the scope of the invention's concept, and in which.

DETAILED DESCRIPTION OF THE INVENTION

Figure 1:
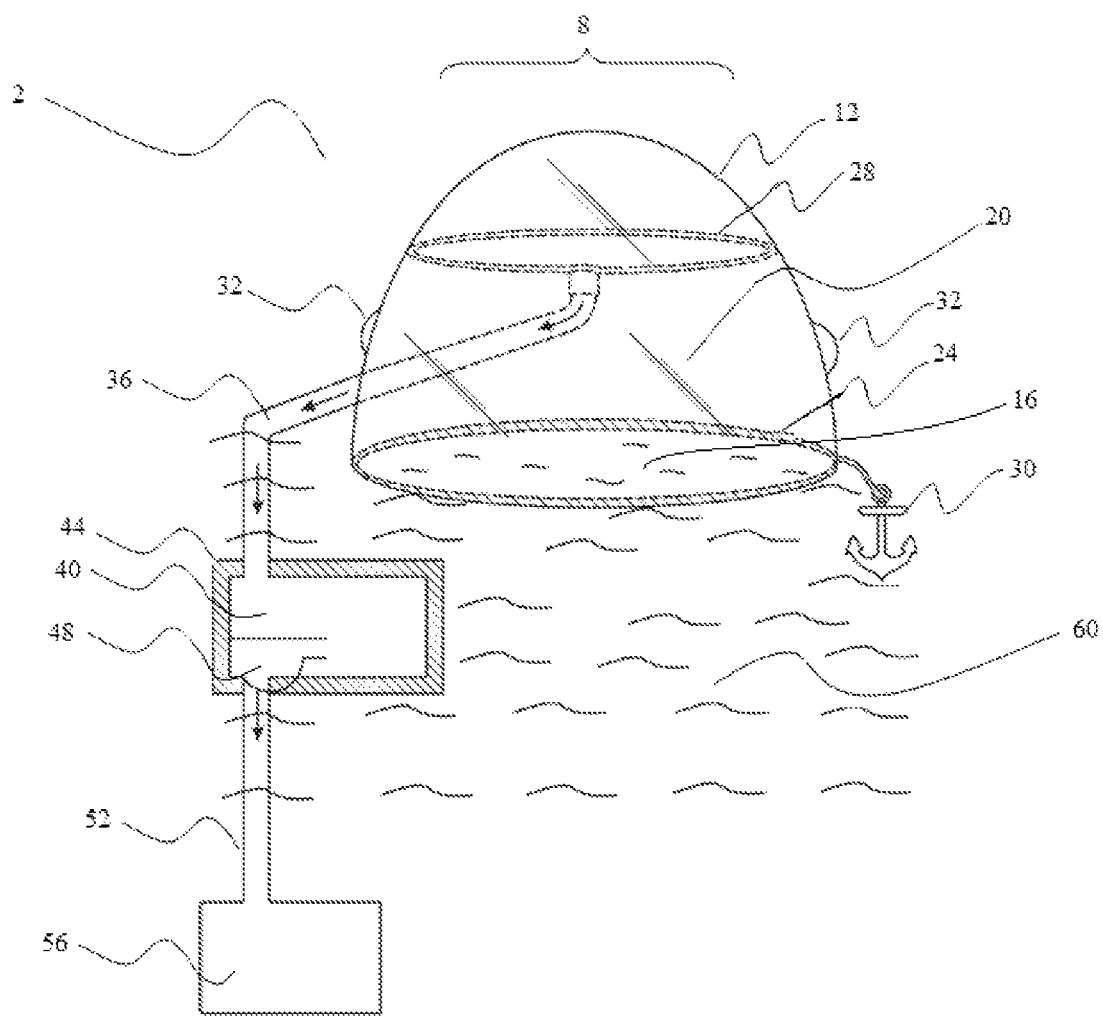
FIG. 1 illustrates a solar still apparatus according to a first embodiment of the present invention.
Figure 2:
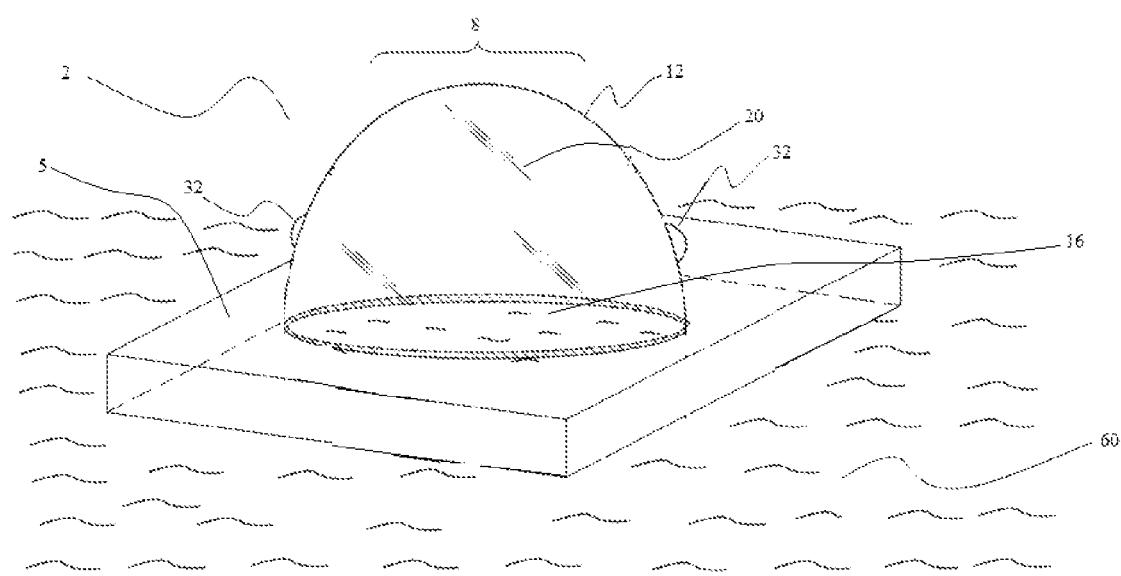
FIG. 2 illustrates a solar still apparatus according to another embodiment of the present invention.

Referring to FIGS. 1 and 2, there is provided a solar still apparatus 2 for converting contaminated water contained in a contaminated water body 60 into distillate water. The contaminated water body 60 can be any natural water body or man-made/artificial water body such as an ocean, sea, river, pond and the like. The solar still apparatus 2 comprises a cover 8 in the form of a geometrical projection comprising a wall 12, an opening 16 and a chamber 20.

The geometrical projection 8 can have any suitable form such as conical, domical, rectangular, square, and the like. A suitable geometrical projection 8 would provide a sufficiently spaced chamber 20 over the surface of the contaminated water body 60 to accumulate the water vapor, efficiently directs the solar rays to the water surface to enhance evaporation, and allows minimum loss of water vapor from the opening 16. The dimensions of the projection 8 may be scaled up or scaled down depending on the application.

The domical form is suitable due to its stability and the geometrical structure of its external wall 12 suitable to bounce solar rays inside the structure towards the opening 16.

The wall 12 is adapted to be in thermal communication with the external environment (atmosphere) for capturing solar heat and adapted to be in optical communication with the opening 16 for allowing passage of the solar rays from the external environment to the opening 16. The solar rays would pass through the wall 12 to the opening 16 via the chamber 20.

The wall 12 is made of a suitable material for capturing the heat all in allowing penetration of the solar rays through the wall 12 inside the opening 16. The wall 12 is also adapted for preventing the formed vapor to evade through its structure to the external environment. The wall 12 may however be modified for a porous structure to enhance the condensation of water vapor through a capillary condensation mechanism.

The wall 16 is preferably made of a transparent material such as transparent plastic or glass. It is preferable for the material to be rigid such as rigid plastic in order to maintain form and structure. The rigid plastic is easy to maintain and has a long standing life time. However a person skilled in the art should appreciate that the material can be a flexible material such as rubber. In this case, the flexible material can be inflatable to take a desired shape. The material is preferably transparent in order to allow the solar rays penetrate the wall 12 inside the chamber 20 in order to reach the opening 16.

If the wall 12 is opaque, the solar rays (or at least a big part) will not be able to penetrate the wall for heating the contaminated water. The apparatus may still function, though less efficiently, as the contaminated water within the opening 16 may still be heated by the neighboring water located outside the opening 16 which is exposed directly to the solar rays. This is because the contaminated water within and outside the opening 16 is interconnected and heat can be exchanged therebetween.

The opening 16 is adapted to be in optical communication with the wall 12 (or a part thereof) and the surface of the contaminated water body 60 for allowing passage of the solar rays from the wall 12 to the surface of the contaminated water body 60 for heating the contaminated water to form a vapor.

Preferably, the optical communication is a direct optical communication in the sense that the solar rays are not interrupted by any other structure between the wall 12 and the opening 16. A domical form allows a good optical communication between the wall 12 and the opening 16. This is because a big part of the solar rays hitting the wall 12 will penetrate the cover wall 12 in the direction of the opening 16.

The opening 16 is also adapted to be in fluid communication with the surface of the contaminated water body 60 and the chamber 20 for allowing passage of the vapor from the surface of the contaminated water body 60 inside the chamber 20. In fact, when the contaminated water is heated by the solar rays inside the opening, it evaporates and climbs inside the chamber 20 through the opening 16. The opening 16 is therefore adapted to allow the vapor passage from the surface of the contaminated water body 60 inside the chamber 20. When the cover 8 is a dome, the opening 16 is defined by a cross-section of the dome orthogonal to the vertical axis between the bottom end and the top end of the dome. The opening may correspond to the base level at the bottom end of the dome, or may correspond to any other orthogonal cross-section above the base level. This last scenario can happen when the base falls below the surface of the contaminated water body when in operation. When the base of the dome floats over the surface of the water body

60, the base should have a suitable structure to restrict the vapor from evading the chamber 16 from between the base and the surface of the water.

The chamber 20 is the internal space of the geometrical projection located between the wall 12 and the opening 16. It is physically defined by the wall 12 of the cover 8. When the apparatus 2 is in operation and the cover opening 16 is emerged inside the contaminated water body 60, the chamber 20 is in fluid communication with the opening 16 for receiving the vapor formed at the surface of the contaminated water body 60 and for condensing said vapor for forming condensed distillate water therefrom.

The chamber 60 is adapted to be enclosed between the wall 12 and the surface of the contaminated water body 60 when the apparatus 2 is in operation in order to form a seal for restricting the vapor from exiting the chamber 20. When the surface of the contaminated water body 60 gets heated, the water evaporates and the vapor climbs up inside the chamber 20 and condensates at the internal surface of the wall 12 inside the chamber 20. This is due to the fact that the temperature of the external environment is lower than the temperature at the surface of the wall 12 inside the chamber 20. The condensed water is distillate water free of any contamination. The contaminants (e.g. salt, etc) stay back inside the contaminated water body 60 which avoids any maintenance in recuperating and cleaning these.

In an embodiment of the present invention, the solar still apparatus 2 further comprises an optical lens 32 adapted to concentrate and direct the sun rays captured from the external environment toward the opening 16. The optical lens 32 is preferably a concave lens secured to the wall 12 of the cover 8. The optical lens 32 can be an independent component or alternatively can form an integral part of the wall 12. The optical lens can be made of plastic, glass or any other suitable material.

The solar still apparatus 2 is adapted for use in deep water bodies such as oceans and seas. The projection structure (cover 8) therefore needs to be floatable in order to have a part of the projection extending outside the water and another part inside or at the surface of the contaminated water body 60. The part outside the water is for capturing the sun rays and heat and for forming the chamber portion 20 for receiving the vapor and forming the condensed water.

There are different manners to enable the cover 8 to float. In an embodiment of the invention, as illustrated in FIG. 1, the base 24 of the cover 8 can be made of a floatable material such as foam. The base 24 can also be made of a non floatable material but supported by an independent component having such a property in order to enable the cover to float over the surface of the contaminated water body 60. It can for example be in the form of a floatable jacket adapted to enrobe the base 24.

In another embodiment of the invention, as illustrated in FIG. 2, there is provided a floater 5 adapted to receive and support the cover 8 for enabling it to float all in allowing fluid communication between the opening 16 and the surface of the contaminated water body 60. The floater can have an opening providing access of the cover to the contaminated water body 60. The floater can for example be a floating vessel or ship.

In an embodiment of the present invention, the solar still apparatus 2 further comprises an anchorage device 30 adapted to be anchored to the ground of the contaminated water body 60 for restricting the base (and the cover) from moving/drifting over the water.

In an embodiment of the present invention, the solar still apparatus 2 further comprises a condensed water collector 28 for collecting the condensed distillate water. Preferably, the condensed water collector 28 is secured to the wall 12 inside the chamber 20. The condensed water collector can be in the form of a gutter running along the wall inside the chamber 20. As the vapor gets condensed at the wall 12 of the chamber 20, the condensed water drops inside the gutter. The condensed water collector can take any other suitable form as a function of the form of the cover 8.

In an embodiment of the present invention, the solar still apparatus 2 further comprises a conduit 36 in fluid communication with the condensed water collector 28 for directing the condensed distillate water outside the chamber 20. The conduit 36 can be in the form of a tube, pipe or any other water transport medium. In one embodiment, the conduit 36 is adapted to be in fluid communication with a network of reservoirs and pipelines for collecting, directing and storing the collected distillate water. This may include pipes and valves located in proximity or remotely from the still solar apparatus 2.

In an embodiment of the present invention, the conduit 36 is adapted to be in fluid communication with off-shore reservoir 40 for storing the collected distillate water. The off-shore reservoir 40 and the conduit 36 are preferably adapted to float over the surface of the contaminated water body 60. They can for example be supported or jacketed by a floatable material such as foam. The off-shore reservoir 40 can have an external layer 44 made of foam or any other floatable material.

In an embodiment of the invention, the solar still apparatus 2 further comprises a pump 48 in fluid communication with the off-shore reservoir 40 for pumping the distillate water stored inside the off-shore reservoir 40 to a land reservoir 56 through long range conduits 52. These long range conduits can also be adapted to float by being made or supported by a floatable material.

While the invention has been made described in details and with reference to specific embodiments thereof, it will be apparent to one skilled in the art that various additions, omissions, and modifications can be made without departing from the spirit and scope thereof.

The invention claimed is:

1. A solar still apparatus for converting contaminated water contained in a contaminated water body into distillate water, the contaminated water body having a water surface, the solar still apparatus comprising a cover in the form of a geometrical projection comprising a wall, an opening, a chamber, a condensed water collector, a conduit, and an offshore reservoir, wherein:
    the geometrical projection form of the cover is a dome extending along a vertical axis from a bottom end to a top end, the bottom end being in contact with the contaminated water body when the apparatus is in operation,
    the wall is adapted to be in thermal communication with an external environment for capturing solar heat, and in optical communication with the opening for allowing passage of solar rays from the external environment to the opening;
    the opening is adapted to be in optical communication with the wall and the surface of the contaminated water body for allowing passage of the solar rays from the wall to the surface of the contaminated water body for heating the contaminated water to form a vapor, and adapted to be in fluid communication with the surface of the contaminated water body and the chamber for allowing passage of the vapor from the surface of the contaminated water body inside the chamber, wherein the opening is in direct optical communication with the wall and the surface of the contaminated water body for allowing uninterrupted and direct passage of the solar rays from the wall to the surface of the contaminated water body; and the chamber is defined by the wall, the chamber being adapted to be in fluid communication with the opening for receiving the vapor formed and condensing said vapor at an internal surface of the wall for forming condensed distillate water therefrom;

wherein the geometrical projection form of the cover enables drainage of the condensed water at the internal surface of the chamber wall downwardly in a direction of the condensed water collector;

wherein the condensed water collector is secured to the wall inside the chamber for collecting the condensed distillate water, is in the form of a gutter running along the wall inside the chamber, located along a frustum of the geometrical projection, wherein the conduit is in fluid communication with the condensed water collector and directs the condensed distillate water outside the chamber; and wherein the off-shore reservoir is in fluid communication with the conduit and stores the condensed distillate water, and the off-shore reservoir is a floatable reservoir adapted to float over the surface of the contaminated water body.

2. The solar still apparatus as claimed in claim 1 wherein the opening is adapted to form a seal with the surface of the contaminated water body for sealing the chamber and restricting the formed vapor from exiting the chamber to the external environment.

3. The solar still apparatus as claimed in claim 1 wherein the wall is made of a transparent material for enabling the passage of the solar rays.

4. The solar still apparatus as claimed in claim 3 wherein the wall is made of a rigid material.

5. The solar still apparatus as claimed in claim 4 wherein the wall material is plastic.

6. The solar still apparatus as claimed in claim 1 further comprising an optical lens adapted to concentrate and direct the solar rays towards the opening.

7. The solar still apparatus as claimed in claim 6 wherein the optical lens forms an integral part of the wall.

8. The solar still apparatus as claimed in claim 1 further comprising a floatable base for supporting and enabling the cover to float over the surface of the contaminated water body.

9. The solar still apparatus as claimed in claim 8, wherein the floatable base comprises foam.

10. The solar still apparatus as claimed in claim 1 further comprising an anchorage device.

11. The solar still apparatus as claimed in claim 1 further comprising a pump in fluid communication with the off-shore reservoir for pumping the distillate water stored inside the off-shore reservoir to a land reservoir through a second conduit.

12. The solar still apparatus as claimed in claim 1 wherein the conduit is a floatable conduit adapted to float over the surface of the contaminated water body.

13. The solar still apparatus as claimed in claim 1, wherein the cover opening is defined by a circular cross-section of the dome orthogonal to the vertical axis between the bottom end and the top end.

14. The solar still apparatus as claimed in claim 13 wherein the cross-section is at the bottom end of the dome.

15. The solar still apparatus as claimed in claim 14 wherein the opening defined by the cross-section has a circumference forming a cover base, the solar still apparatus further comprising a floatable material jacketing the base for enabling the base to float over the surface of the contaminated water body.

16. The solar still apparatus of claim 6, wherein the optical lens is a concave lens secured to the wall.

* * * * *